(12) United States Patent
Pape et al.

(10) Patent No.: US 11,633,935 B2
(45) Date of Patent: Apr. 25, 2023

(54) HUMIDITY AND SAG RESISTANT BUILDING PANEL

(71) Applicant: ARMSTRONG WORLD INDUSTRIES, INC., Lancaster, PA (US)

(72) Inventors: James D. Pape, Columbia, PA (US); Gourish Sirdeshpande, Lancaster, PA (US); Joanne Lefever, Lancaster, PA (US); Kimberly Diffenbaugh, Lancaster, PA (US); Jere Myers, Washington Boro, PA (US); John Felegi, Jr., Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 399 days.

(21) Appl. No.: 16/813,568

(22) Filed: Mar. 9, 2020

(65) Prior Publication Data

US 2020/0207056 A1    Jul. 2, 2020

Related U.S. Application Data

(62) Division of application No. 15/598,374, filed on May 18, 2017, now Pat. No. 10,639,865.

(Continued)

(51) Int. Cl.
*B32B 5/02* (2006.01)
*B32B 7/12* (2006.01)
(Continued)

(52) U.S. Cl.
CPC ........... *B32B 5/022* (2013.01); *B32B 3/26* (2013.01); *B32B 5/028* (2013.01); *B32B 5/26* (2013.01);
(Continued)

(58) Field of Classification Search
CPC .......... B32B 5/022; B32B 3/26; B32B 5/028; B32B 5/26; B32B 7/12; B32B 37/12; B32B 2305/20; E04B 1/8409; E04B 9/045; E04B 9/0435; E04B 9/067; E04B 2001/742; E04C 2/16; E04C 2/284
See application file for complete search history.

(56) References Cited

U.S. PATENT DOCUMENTS 3,223,580 A    12/1965    Eckert et al.
3,275,496 A    9/1966    Sponsel
(Continued)

FOREIGN PATENT DOCUMENTS

CN    1997799 A    7/2007
CN    102803628 A    11/2012
JP    S 5158511 U    5/1976

OTHER PUBLICATIONS

Chinese Search Report for related application No. 2017800027966 issued with office action dated Aug. 19, 2020.

*Primary Examiner* — Jeremy A Luks
(74) *Attorney, Agent, or Firm* — Craig M. Sterner (57) ABSTRACT

Described herein is an stain and sag resistant acoustic building panel comprising a porous body formed from building material and latex binder, wherein the building material may include fibers and filler and at one of the building materials has been pre-treated with a charge-modifying component, thereby enhancing the sag-resistance of the building panel.

20 Claims, 8 Drawing Sheets

Related U.S. Application Data (60) Provisional application No. 62/338,093, filed on May 18, 2016.

(51) Int. Cl.

| | |
|---|---|
| *B32B 5/26* | (2006.01) |
| *B32B 3/26* | (2006.01) |
| *B32B 37/12* | (2006.01) |
| *E04C 2/16* | (2006.01) |
| *E04C 2/284* | (2006.01) |
| *E04C 2/24* | (2006.01) |
| *E04C 2/52* | (2006.01) |
| *E04C 2/28* | (2006.01) |
| *E04B 2/00* | (2006.01) |
| *E04B 5/02* | (2006.01) |

(52) U.S. Cl.
CPC ............... *B32B 7/12* (2013.01); *E04C 2/16* (2013.01); *E04C 2/246* (2013.01); *E04C 2/28* (2013.01); *E04C 2/284* (2013.01); *E04C 2/46* (2013.01); *E04C 2/50* (2013.01); *E04C 2/526* (2013.01); *E04C 2/528* (2013.01); *B32B 37/12* (2013.01); *B32B 2250/02* (2013.01); *B32B 2255/02* (2013.01); *B32B 2255/26* (2013.01); *B32B 2262/0253* (2013.01); *B32B 2262/0269* (2013.01); *B32B 2262/0276* (2013.01); *B32B 2262/062* (2013.01); *B32B 2262/08* (2013.01); *B32B 2262/101* (2013.01); *B32B 2262/108* (2013.01); *B32B 2264/0214* (2013.01); *B32B 2264/10* (2013.01); *B32B 2264/102* (2013.01); *B32B 2264/104* (2013.01); *B32B 2305/20* (2013.01); *B32B 2307/102* (2013.01); *B32B 2307/72* (2013.01); *B32B 2307/724* (2013.01); *B32B 2307/73* (2013.01); *B32B 2307/734* (2013.01); *B32B 2419/00* (2013.01); *B32B 2607/00* (2013.01)

(56) References Cited

U.S. PATENT DOCUMENTS

| | | |
|---|---|---|
| 3,549,485 A | 12/1970 | Eckert |
| 3,714,088 A | 1/1973 | Manning |
| 3,748,223 A | 7/1973 | Urig |
| 4,374,202 A | 2/1983 | Zucker et al. |
| 4,389,282 A | 6/1983 | Yonushonis et al. |
| 4,447,560 A | 5/1984 | Piersol |
| 4,448,639 A | 5/1984 | Long |
| 4,925,529 A | 5/1990 | Dotzauer et al. |
| 4,963,603 A | 10/1990 | Felegi, Jr. et al. |
| 5,122,559 A | 6/1992 | Dotzauer et al. |
| 5,126,013 A * | 6/1992 | Wiker .......... D21H 23/765 162/146 |
| 5,250,153 A | 10/1993 | Izard et al. |
| 6,616,804 B2 | 9/2003 | Foster et al. |
| 6,855,753 B1 | 2/2005 | Englert |
| 7,781,062 B2 | 8/2010 | Kitaike |
| 7,875,358 B2 | 1/2011 | Englert |
| 8,133,354 B2 | 3/2012 | Baig |
| 8,309,231 B2 | 11/2012 | Carbo et al. |
| 8,470,921 B2 | 6/2013 | Ramotowski |
| 8,715,465 B2 | 5/2014 | Vyorykka et al. |
| 8,785,519 B2 | 7/2014 | Krishnan |
| 9,506,244 B2 | 11/2016 | Goletto |
| 2002/0096278 A1 | 7/2002 | Foster et al. |
| 2004/0231916 A1 | 11/2004 | Englert et al. |
| 2007/0055012 A1 | 3/2007 | Caldwell |
| 2007/0265384 A1 | 11/2007 | Ramotowski |
| 2008/0207774 A1 | 8/2008 | Krishnan |
| 2010/0016151 A1 | 1/2010 | Caldwell et al. |
| 2010/0146887 A1 | 6/2010 | Wiker et al. |
| 2010/0256293 A1 | 10/2010 | Lu |
| 2010/0260866 A1 | 10/2010 | Lu |
| 2010/0320029 A1 | 12/2010 | Cao et al. |
| 2012/0156471 A1 | 6/2012 | Lu et al. |
| 2013/0189516 A1 | 7/2013 | Sugino et al. |
| 2013/0330532 A1 | 12/2013 | Dierschke et al. |
| 2016/0264461 A1 | 9/2016 | Peng et al. |
| 2017/0268229 A1 | 9/2017 | Li |
| 2017/0369695 A1 | 12/2017 | Gantenbein et al. |

* cited by examiner

Select a building material having a first ionic charge that is either anionic or cationic Add a charge-modifying component to the building material to form a charge-modified building material, the charge-modifying component having a second ionic charge that is opposite the first ionic charge of the building material Add latex polymer to the charge-modified building material, the latex polymer having a third ionic charge that is the same as the first ionic charge of the building material Form a building panel from the mixture of latex polymer and charge-modified building material

FIG. 4

```
┌─────────────────────────────────────────────┐
│   Select a fiber having a first ionic charge │
│        that is anionic or cationic           │
└─────────────────────────────────────────────┘
```

```
┌─────────────────────────────────────────────────────┐
│  Add a charge-modifying component to the fiber to form a │
│  charge-modified fibrous material, the charge-modifying  │
│ component having a second ionic charge that is opposite to│
│         the first ionic charge of the fiber             │
└─────────────────────────────────────────────────────┘
```

```
┌─────────────────────────────────────────────────────┐
│    Add latex polymer to the charge-modified fibrous │
│  material, the latex polymer having a third ionic charge│
│   that is the same as the first ionic charge of the fiber│
└─────────────────────────────────────────────────────┘
```

```
┌─────────────────────────────────────────────────────┐
│   Form a building panel from the mixture of latex   │
│   polymer and charge-modified fibrous material      │
└─────────────────────────────────────────────────────┘
```

FIG. 5

Select a particle having a first ionic charge that is anionic or cationic

Add a charge-modifying component to the particle to form a charge-modified particle, the charge-modifying component having a second ionic charge that opposite to the first charge of the particle Add fibers and latex polymer to the charge-modified particle, the latex polymer having a third ionic charge that is the same as the first ionic charge of the particle Form a building panel from the mixture of latex polymer, fibers, and charge-modified particle

HUMIDITY AND SAG RESISTANT BUILDING PANEL

CROSS-REFERENCE TO RELATED APPLICATIONS

This application is a divisional application of U.S. Non-Provisional application Ser. No. 15/598,374, filed May 18, 2017, which claims the benefit of U.S. Provisional Application No. 62/338,093, filed May 18, 2016, which is incorporated herein by reference in its entirety

BACKGROUND

Building panels—specifically acoustically previous ceiling panels—have a tendency to sag when exposed to high-humidity environments. These building panels, which are formed from a combination of starch, and other binders, organic and inorganic fiber, and optional filler, are put under added stress in high-humidity environments because the amount of water absorbed by the building panel increases and, starch as well as many polymeric binders are hydrophilic and lose strength when exposed to humidity. With enough exposure to high-humidity, the structural integrity resulting from bond between the binder and the fiber and/or filler is compromised causing the building panel to sag downward. Additionally, such building panels may exhibit staining on the exposed faces after prolonged exposure to moisture.

Previous attempts at preventing such sagging and included adding large amounts of polymeric binder to the building panel. Substituting hydrophilic binders with high strength hydrophobic binders may increase sag resistance of the panel under humid conditions, however these binders are far more expensive than the existing water sensitive binders. Thus, there exists a need for a building panel having greater resistance to sagging and/or face-staining over prolonged periods of exposure to moisture.

BRIEF SUMMARY

The present invention is directed to a building panel comprising: a latex binder, a fibrous material comprising a fiber pre-treated with a charge-modifying component, wherein the latex is present in a non-zero amount ranging up to about 15 wt. % based on the total dry-weight of the building panel.

In other embodiments, the present invention is directed to a building panel comprising: a latex binder, a first charge-modified particle, and a fiber; wherein the first charge-modified particle comprises a first particle pre-treated with a charge-modifying component.

In other embodiments, the present invention is directed to a method for producing a sag resistant building panel comprising: a) pre-treating a building material with a charge-modifying component to form a pre-treated building material, b) mixing the pre-treated building material with a latex binder to form an aqueous slurry, and c) forming the building panel from the aqueous slurry, wherein the latex binder is present in a non-zero amount ranging up to about 15 wt. % based on the total dry-weight of the building panel.

Other embodiments of the present invention include a method for producing a sag resistant building panel comprising: a) forming an aqueous slurry comprising a building material having a first ionic charge and a charge-modifying component having a second ionic charge that is opposite to the first charge, the aqueous slurry having a pH less than about 7, b) adding a latex binder to the aqueous slurry; and c) forming the building panel from the aqueous slurry.

Other embodiments of the present invention include a building panel comprising: a latex binder, a fibrous material comprising a mineral wool pre-treated with a charge-modifying component having an cationic charge, wherein the latex is present in a non-zero amount ranging up to about 15 wt. % based on the total dry-weight of the building panel.

In other embodiments, the present invention includes a method for producing a sag resistant building panel comprising: a) forming an aqueous slurry comprising mineral wool and a charge-modifying component having a cationic charge, the aqueous slurry having a pH less than about 7, b) adding a latex binder to the aqueous slurry, the latex binder having an anionic charge, and c) forming the building panel from the aqueous slurry, wherein the latex binder is present in an amount ranging from a non-zero amount up to about 15 wt. % based on the total dry-weight of the building panel Other embodiments of the present invention include an acoustic ceiling panel comprising a porous body having an upper surface opposite a lower surface and at least one side surface extending between the upper surface and the lower surface, the porous body comprising a latex binder and a fibrous material; a non-woven scrim adjacent to the lower surface of the porous body, the non-woven scrim; and a coating applied to the non-woven scrim, the coating comprising a first hydrophobic component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Figure 1:
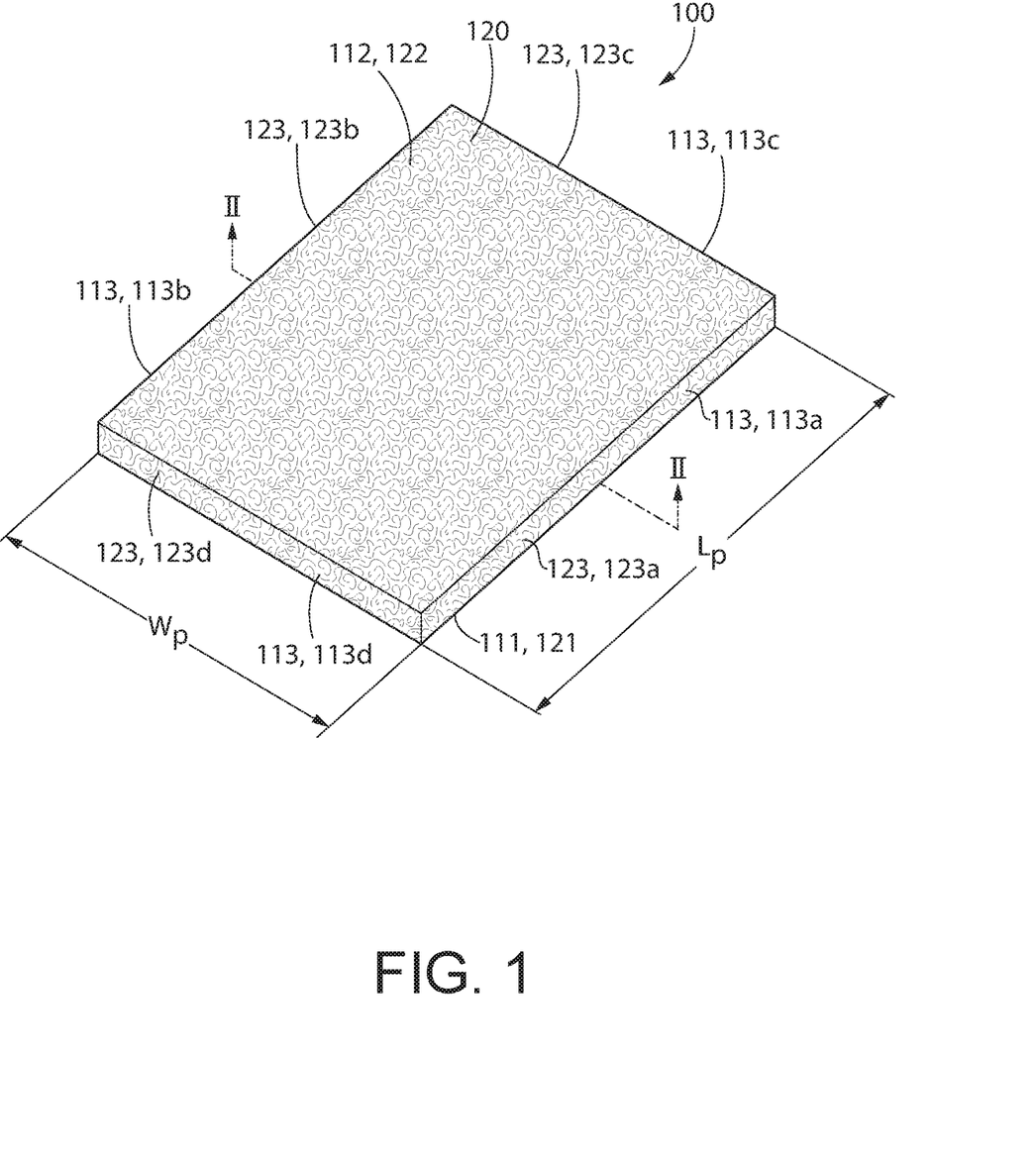
FIG. 1 is top perspective view of a building panel according to the present invention.

Referring to FIG. 1, the building panel 100 of the present invention may comprise a first major surface 111 opposite a second major surface 112. The ceiling panel 100 may further comprise a side surface 113 that extends between the first major surface 111 and the second major surface 112, thereby defining a perimeter of the ceiling panel 100.

Figure 3:
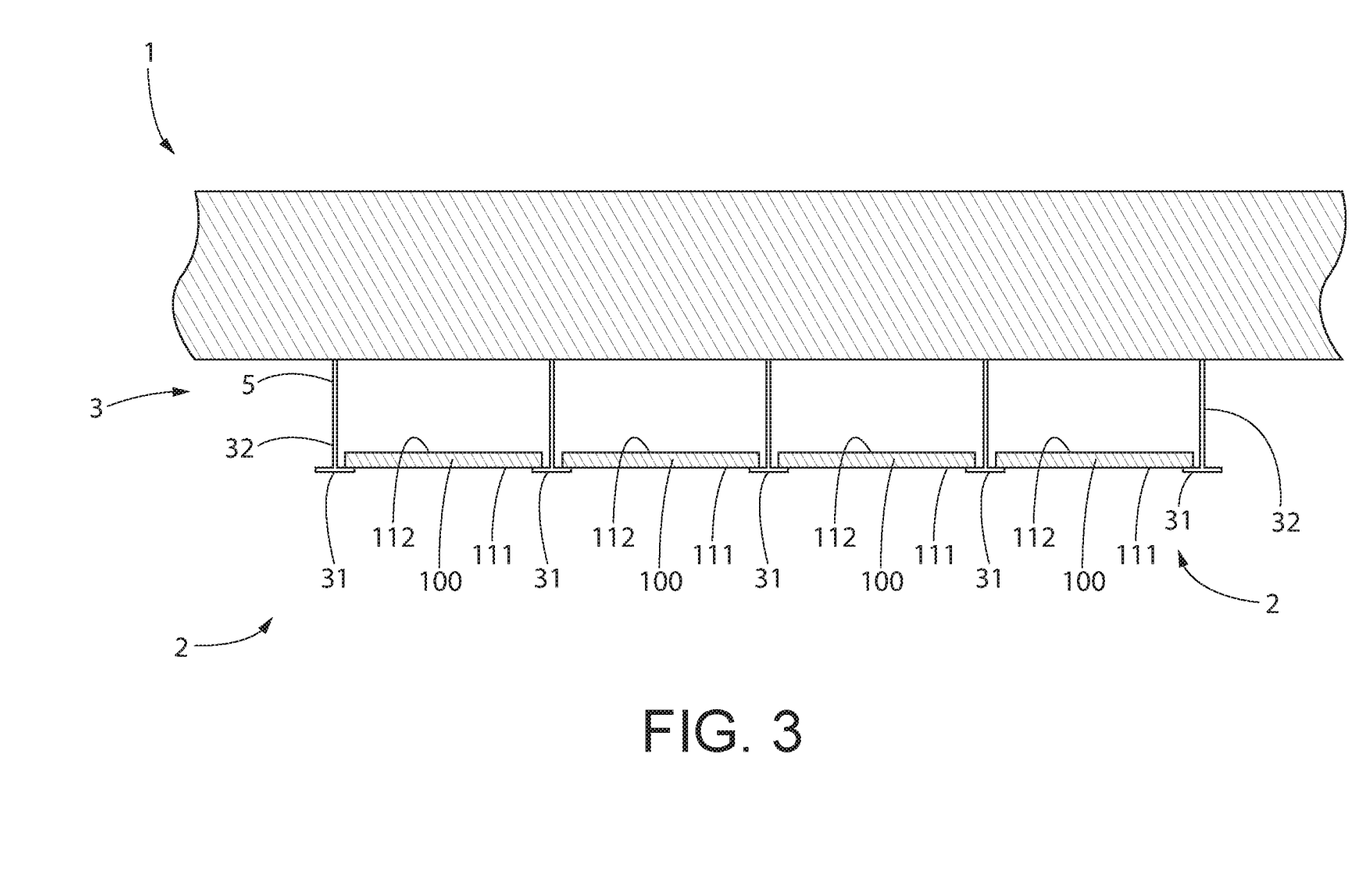
FIG. 3 is a ceiling system comprising the building panel of the present invention.

Referring to FIG. 3, the present invention may further include a ceiling system 1 comprising one or more of the building panels 100 installed in an interior space, whereby the interior space comprises a plenary space 3 and an active room environment 2. The plenary space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid. The plenary space 3 exists above the ceiling support grid and the active room environment 2 exists below the ceiling support grid. In the installed state, the first major surface 111 of the building panel 100 faces the active room environment 2 and the second major surface 112 of the building panel 100 faces the plenary space 3.

Figure 2:
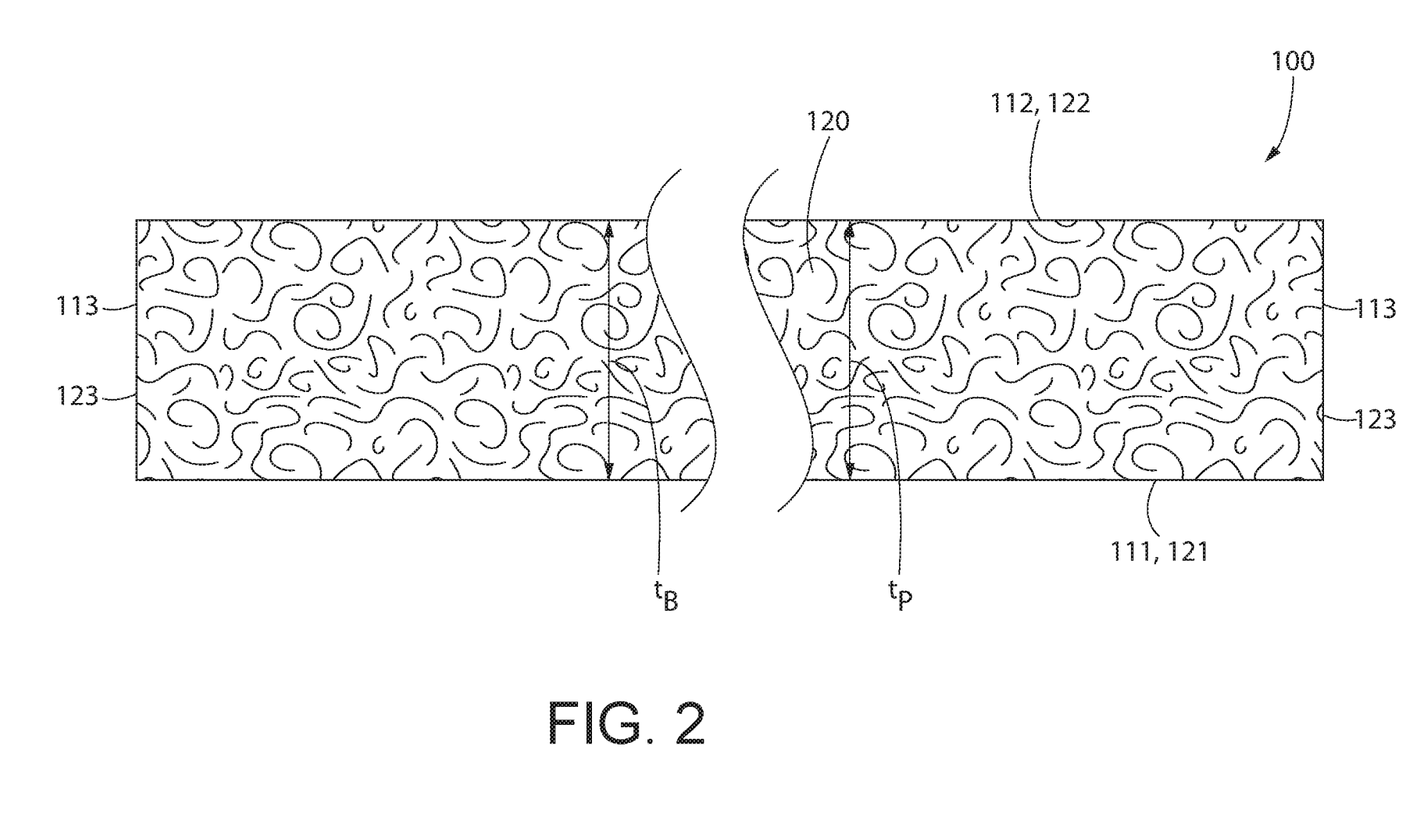
FIG. 2 is a cross-sectional view of the building panel according to the present invention, the cross-sectional view being along the II line set forth in FIG. 1.

Referring now to FIGS. 1 and 2, the building panel 100 of the present invention may have a panel thickness $t_P$ as measured from the first major surface 111 to the second major surface 112. The panel thickness $t_P$ may range from about 4.0 mm to about 25.0 mm—including all values and sub-ranges there-between. In a preferred embodiment, the panel thickness $t_P$ may range from about 4.0 mm to about 12 mm—including all values and sub-ranges there-between. In a preferred embodiment, the panel thickness $t_P$ may range from about 5.0 mm to about 6.0 mm—including all values and sub-ranges there-between.

The side surface 113 of the building panel 100 may comprise a first side surface 113a, a second side surface 113b, a third side surface 113c, and a fourth side surface 113d. The first side surface 113a may be opposite the second side surface 113b. The third side surface 113c may be opposite the fourth side surface 113d. The first and second side surfaces 113a, 113b may be substantially parallel to each other. The third and fourth side surfaces 113c, 113d may be substantially parallel to each other. The first and second side surfaces 113a, 113b may each intersect the third and fourth side surfaces 113c, 113d to form the perimeter of the ceiling panel 100.

The building panel 100 may have a panel length $L_P$ as measured between the third and fourth side surfaces 113c, 113d (along at least one of the first and second side surfaces 113a, 113b). The panel length $L_P$ may range from about 25.0 cm to about 300.0 cm—including all values and sub-ranges there-between. The building panel 100 may have a panel width $W_P$ as between the first and second side surfaces 113a, 113b (and along at least one of the third and fourth side surfaces 113c, 113d). The panel width $W_P$ may range from about 25.0 cm to about 125.0 cm—including all values and sub-ranges there-between. The panel length $L_P$ may be the same or different than the panel width $W_P$.

The building panel 100 may comprise a body 120 having an upper surface 122 opposite a lower surface 121 and a body side surface 123 that extends between the upper surface 122 and the lower surface 121, thereby defining a perimeter of the body 120. The body 120 may have a body thickness $t_B$ that extends from the upper surface 122 to the lower surface 121. The body thickness $t_B$ may substantially equal to the panel thickness $t_P$.

The first major surface 111 of the building panel 100 may comprise the lower surface 121 of the body 120. The second major surface 112 of the building panel 100 may comprise the upper surface 122 of the body 120. When the first major surface 111 of the building panel 100 comprises the lower surface 121 of the body 120 and the second major surface 112 of the building panel 100 comprises the upper surface 122 of the body 120, the panel thickness $t_P$ is substantially equal to the body thickness $t_B$.

The body side surface 123 may comprise a first body side surface 123a, a second body side surface 123b, a third body side surface 123c, and a fourth body side surface 123d. The first body side surface 123a may be opposite the second body side surface 123b. The third body side surface 123c may be opposite the fourth body side surface 123d. The first side surface 113a of the building panel 100 may comprise the first body side surface 123a of the body 120. The second side surface 113b of the building panel 100 may comprise the second body side surface 123b of the body 120. The third side surface 113c of the building panel 100 may comprise the third body side surface 123c of the body 120. The fourth side surface 113d of the building panel 100 may comprise the fourth body side surface 123d of the body 120.

The first and second body side surfaces 123a, 123b may each intersect the third and fourth body side surfaces 123c, 123d to form the perimeter of the body 120. The body 120 may have a width that is substantially equal to the panel width $W_P$—as measured between the first and second body side surfaces 123a, 123b. The body 120 may have a length that is substantially equal to the panel length $L_P$—as measured between the third and fourth body side surfaces 123c, 123d.

A coating may be applied to any one of the upper surface 122, lower surface 121, first body side surface 123a, second body side surface 123b, third body side surface 123c, and/or fourth body side surface 123d of the body 120. The coating may be continuous or discontinuous. The coating may comprise pigment. For the coating that may be applied to the lower surface 121 of the body 120, the first major surface 111 of the building panel 100 will comprise the coating. For the coating that may be applied the side surface 123 of the body 120, the side surface 113 will comprise the coating.

The body 120 may be porous, thereby allowing airflow through the body 120 between the upper surface 122 and the lower surface 121—as discussed further herein. The body 120 may be formed from a building material and a latex binder. The body 120 may have a density of at least 75 kg/m³.

The latex binder may be present in an amount ranging from a non-zero amount up to about 15 wt. % based on the total dry weight of the body 120—including all values and sub-ranges there-between. In a preferred embodiment, the latex binder may be present in an amount ranging from about 1 wt. %, up to about 15 wt. % based on the total dry weight of the body 120—including all values and sub-ranges there-between. In a preferred embodiment, the latex binder may be present in an amount ranging from about non-zero amount, preferably at least 1 wt. %, up to about 10 wt. % based on the total dry weight of the body 120—including all values and sub-ranges there-between. The latex binder may be present in an amount ranging from about 5 wt. % to about 8 wt. % based on the total dry weight of the body 120—including all value and sub-ranges there-between.

The phrase "dry-weight" refers to the weight of a referenced component without the weight of any carrier. Thus, when calculating the weight percentages of components in the dry-state, the calculation should be based solely on the solid components (e.g., binder, filler, hydrophobic component, fibers, etc.) and should exclude any amount of residual carrier (e.g., water, VOC solvent) that may still be present from a wet-state, which will be discussed further herein. According to the present invention, the phrase "dry-state" may also be used to indicate a component that is substantially free of a carrier, as compared to the term "wet-state," which refers to that component still containing various amounts of carrier—as discussed further herein.

The latex binder may comprise a polymer having at least one functional group that has an ionic charge or is capable of creating an ionic charge. The ionic charge may be anionic or cationic. The polymer may comprise functional groups that are both anionic and cationic, however, that polymer will exhibit a greater amount of either the anionic or cationic groups resulting in the polymer being either cationic or anionic overall.

The polymer used in the latex binder may be formed from the polymerization product of one or more unsaturated monomers. Non-limiting examples of unsaturated monomers include an ethylenically unsaturated carboxylic acid monomer, nonionic vinyl monomers, and ethylenically unsaturated amine containing compounds, and combinations thereof.

The unsaturated carboxylic acid monomer may include $C_3$-$C_8$ α, β-ethylenically unsaturated carboxylic acid monomer having the general formula:

where R is H, —COOX, or $CH_3$;
R' is H, $C_1$-$C_4$ alkyl, or —$CH_2$—COOX; and
X is H or $C_1$-$C_4$ alkyl.

Non-limiting examples of the unsaturated carboxylic acid monomer may include acrylic acid; methacrylic acid; a mixture of acrylic acid and methacrylic acid; itaconic acid; fumaric acid; crotonic acid; aconitic acid, maleic acid, various α-substituted acrylic acids such as α-ethacrylic acid, α-propyl acrylic acid and α-butyl acrylic acid, and half esters of these polycarboxylic acids and mixtures of these polycarboxylic acids.

The carboxylic acid group present in the polymer backbone of the latex binder may form a carboxylate ion, $COO^-$, which is capable for forming an ion having a negative charge (i.e., anionic charge). Thus, the amount of carboxylic acid groups present on the polymer backbone will impact the resulting ionic charge of the latex binder. Polymers formed from greater relative amounts of the unsaturated carboxylic acid monomer will increase the anionic nature of the resulting latex binder.

The nonionic vinyl monomer may include a $C_2$-$C_{12}$ α,β-ethylenically unsaturated vinyl monomer. The $C_2$-$C_{12}$ α,β-ethylenically unsaturated vinyl monomer having the general formula:

where Y is H, $CH_3$, or Cl;
Z is —COOX', CH=$CH_2$, —$C_6H_4$—R", CN, or Cl;
X' is $C_1$-$C_8$ alkyl or $C_2$-$C_8$ hydroxyalkyl;
R" is H, Cl, Br, or $C_1$-$C_4$ alkyl.

Non-limiting examples of the nonionic vinyl monomer include $C_1$-$C_8$ alkyl and $C_2$-$C_8$ hydroxyalkyl esters of acrylic and methacrylic acid, such as ethyl acrylate, ethyl methacrylate, methyl methacrylate, 2-ethylhexyl acrylate, butyl acrylate, butyl methacrylate, 2-hydroxyethyl acrylate, 2-hydroxybutyl methacrylate; styrene, vinyltoluene, t-butylstyrene, isopropylstyrene, and p-chlorostyrene; vinyl acetate, vinyl butyrate, vinyl caprolate; acrylonitrile, methacrylonitrile, butadiene, isoprene, vinyl chloride vinylidene chloride, and the like Additionally, a monovinyl ester such as ethyl acrylate or a mixture thereof with styrene, hydroxyethyl acrylate, acrylonitrile, vinyl chloride or vinyl acetate may be preferred. The nonionic vinyl monomer described hereinabove can be a mixture of co-monomers.

The ethylenically unsaturated amine containing compounds may be compounds having one or two unsaturated groups, as well as an amine group. Non-limiting examples of the ethylenically unsaturated amine containing compound include N-allylmethacrylamide.

The amine group present in the polymer backbone of the latex binder may form a positively charged ion, $N^+$, (i.e., cationic charge). Thus, the amount of ethylenically unsaturated amine containing compound present on the polymer backbone will impact the resulting ionic charge of the latex binder. Polymers formed from greater relative amounts of the ethylenically unsaturated amine containing compound will increase the cationic nature of the resulting latex binder.

The polymer forming the latex binder may have a glass transition temperature ranging from about 50° C. to about 120° C.—including all temperatures and sub-ranges there-between. In a preferred embodiment, the polymer forming the latex binder may have a glass transition temperature ranging from about 60° C. to about 110° C.—including all temperatures and sub-ranges there-between.

The building materials of the present invention may include fiber, filler, and combinations thereof. The building material may be present in an amount ranging from about 75 wt. % to about 99 wt. % based on the total weight of the body 120—including all amounts and sub-ranges there-between.

The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof. The fibers may be present in an amount ranging from about 5 wt. % to about 99 wt. % based on the total dry weight of the body 120—including all values and sub-ranges there-between.

The filler may be organic filler, inorganic filler, or a blend thereof. Non-limiting examples of inorganic filler may include powders of calcium carbonate, including limestone, titanium dioxide, sand, barium sulfate, clay, mica, dolomite, silica, talc, perlite, gypsum, wollastonite, expanded-perlite, calcite, aluminum trihydrate, pigments, zinc oxide, or zinc sulfate. Non-limiting examples of organic filler may include particles of organic polymer.

The filler may be present in an amount ranging from about 25 wt. % to about 99 wt. % based on the total dry weight of the body 120—including all values and sub-ranges there-between. The filler may have a particle size ranging from about 50 microns to about 700 microns—including all sizes and sub-ranges there-between. In a preferred embodiment, the filler may have a particle size ranging from about 2.0 microns to about 1000.0 microns—including all sizes and sub-ranges there-between.

The body 120 may further comprise additives—such as defoamers, wetting agents, biocides, dispersing agents, flame retardants, and the like. The additive may be present in an amount ranging from about 0.01 wt. % to about 30 wt. % based on the total dry weight of the body 120—including all values and sub-ranges there-between.

During manufacture of the building panel 100 of the present invention, at least one of the building materials may be pre-treated with a charge-modifying component prior to being combined with the latex binder.

The charge-modifying component may be ionic—having either a cationic or anionic charge. Non-limiting examples of cationic charge-modifying component includes aluminum sulfate, poly(diallyldimethylammonium chloride), and combinations thereof. The charge-modifying component may be present in an amount ranging from about 0.1 wt. % to about 4.0 wt. % based on the total dry-weight of the body 120—including all values and sub-ranges there-between.

Figure 4:
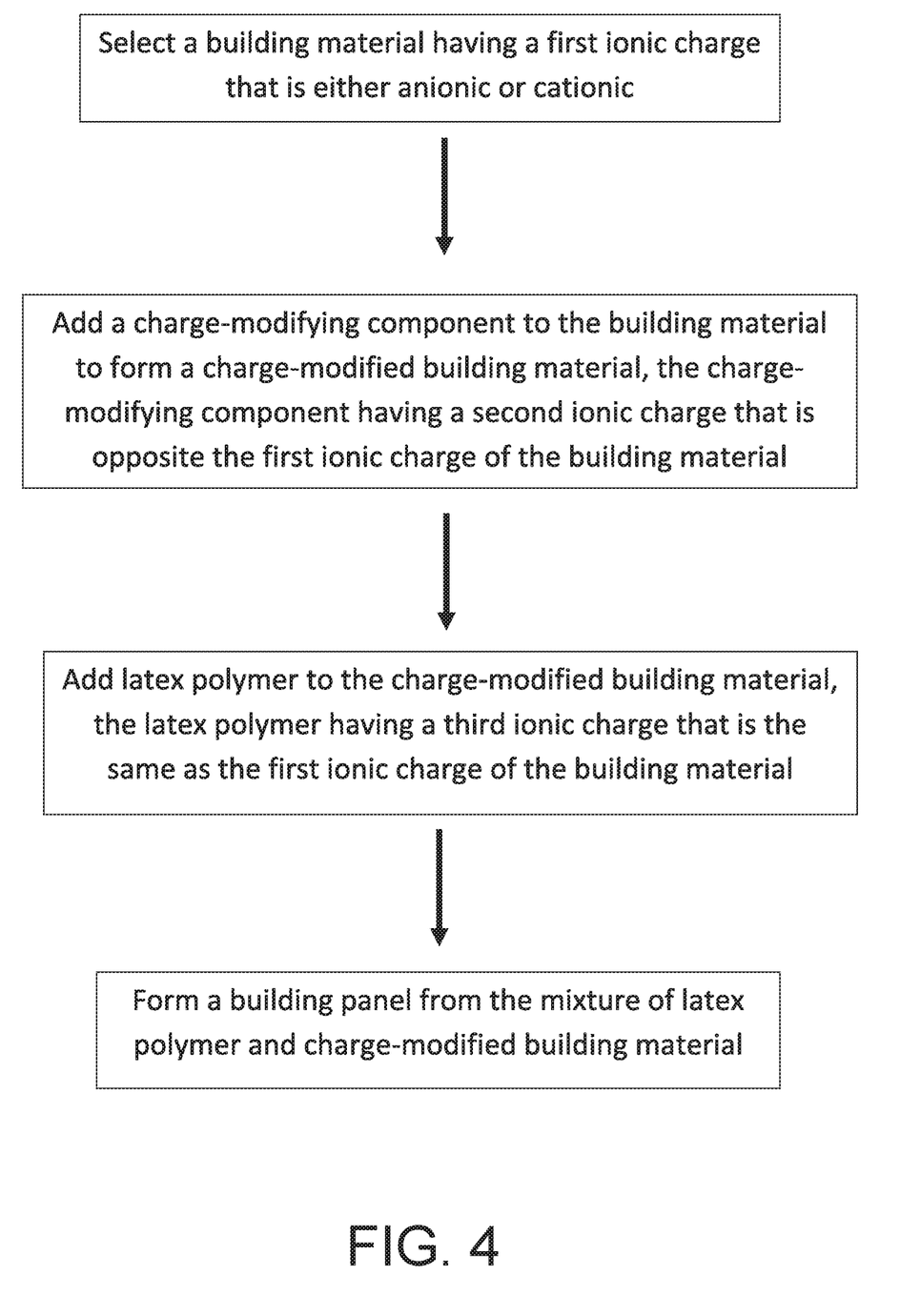
FIG. 4 is a flow-chart demonstrating the general method of producing the building panel according to the present invention.

Referring now to FIG. 4, the general production of the building panel 100 includes, but is not limited to, first selecting a building material that has a first ionic charge. The first ionic charge of the building material may be anionic or cationic. Subsequently, a charge-modifying component is added to the building material, thereby pre-treating the building material with the charge-modifying component to form a charge-modified building material. The charge-modifying component comprises a second ionic charge that may be anionic or cationic. The second ionic charge of the charge-modifying component and the first ionic charge of the building material have opposite charges.

For the purposes of this invention, the term "opposite charge" refers to positively charged ions (i.e., cation or "cationic charge") and negatively charged ions (i.e., anion or "anionic charge"). The ions having opposite charge may vary in strength. For example, the first ionic charge of the building material may have a weak anionic charge and the second ionic charge of the charge-modifying component may have a strong cationic charge. Although the strength may differ, the first and second ionic charges are still opposite because each have a different overall net charge of positive vs. negative. The type and strength of the ionic charge (i.e., cationic or anionic) of a material may be measured according to polyelectrolyte titration with a streaming current detector, specifically by Mutek PCD 02 Particle Charge Analyzer. The titration is performed with known cationic (DADMAC) or anionic (PVSK) standards.

The charge-modified building material may then be combined with a latex binder having a third ionic charge that may be anionic or cationic. The third ionic charge of the latex binder and the first ionic charge of the building material have the same charge. The latex binder and charge-modified building material may then be blended and further processed into the building panel 100 of the present invention.

For the purposes of this invention, the term "same charge" refers to ions that are both either positively charged (cation or "cationic charge") or both negatively charged (anion or "anionic charge"). The first and second ionic charges may strength so long as the overall net charge is either both negative or both positive. For example, the first ionic charge of the building material may have a weak anionic charge and the third ionic charge of the latex binder may have a strong anionic charge. Although the strength may differ, the first and third ionic charge are still the same charge because each have the same overall net charge of positive (or negative).

As discussed, the charge-modifying component modifies the charge of at least one of the building materials such that the resulting charge-modified building material has greater compatibility with the latex binder. The result is better bonding between the latex binder and the building material, thereby providing a building panel that has enhanced mechanical strength and greater resistance to sag in high-humidity environments compared to a building panel having the same relative amount of latex binder and building material but without any pre-treatment of the building materials with the charge-modifying component. According to the present invention, the term "high-humidity" refers to environments having a relative humidity (RH) of at least 80%.

Additionally, the body 120 of the present invention is a porous structure (also referred to as "porous body"). The body 120 may be porous enough that it allows for enough airflow through the body 120 (under atmospheric conditions) for the building panel 100 to function as an acoustic ceiling panel, which requires properties related to noise reduction and sound attenuation properties—as discussed further herein.

The body 120 of the present invention may have a porosity ranging from about 60% to about 98%—including all values and sub-ranges there between. In a preferred embodiment, the body 120 has a porosity ranging from about 75% to 95%—including all values and sub-ranges there between. According to the present invention, porosity refers to the following:

$$\% \text{ Porosity} = [V_{Total} - (V_{Binder} + V_{Fiber} + V_{CMC} + V_{Filler})] / V_{Total}$$

Where $V_{Total}$ refers to the total volume of the body 120 defined by the upper surface 122, the lower surface 121, and the body side surfaces 123. $V_{Binder}$ refers to the total volume occupied by the latex binder in the body 120. $V_{Fiber}$ refers to the total volume occupied by the fibers 130 in the body 120. $V_{Filler}$ refers to the total volume occupied by the filler in the body 120. $V_{CMC}$ refers to the total volume occupied by the charge-modifying component in the body 120. Thus, the % porosity represents the amount of free volume within the body 120.

According to the present invention, pre-treating at least one of the building materials with the charge-modifying component provides a building panel with less latex binder that has the same mechanical strength and sag resistance as a building panel with no pre-treatment of the same building materials and more latex binder. With less latex binder, less volume in the body 120 is occupied by the binder ($V_{Binder}$), thereby increasing the porosity of the body 120.

Increased porosity results in the body 120 having a better airflow (i.e., less air-flow resistance), which translates to a building panel better suited for acoustical applications.

The body 120 may have an air flow resistance that is measured through the body 120 between the upper and lower surfaces 121, 122. Air flow resistance is a measure by the following formula:

$$R = (P_A - P_{ATM}) / V$$

Where R is air flow resistance (measured in ohms); $P_A$ is the applied air pressure; $P_{ATM}$ is atmospheric air pressure; and V is volumetric airflow. The air flow resistance of the body 120 may range from about 0.5 ohm to about 50 ohms—including all resistances and sub-ranges there-between. In a preferred embodiment, the airflow resistance of the body 120 may range from about 0.5 ohms to about 35 ohms—including all resistances and sub-ranges there-between.

The body 120 of the present invention may be porous enough to exhibit sufficient airflow for the resulting building panel 100 to have the ability to reduce the amount of reflected sound in a room. The reduction in amount of reflected sound in a room is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The building panel 100 of the present invention exhibits an NRC of at least about 0.5. In a preferred embodiment, the building panel 100 of the present invention may have an NRC ranging from about 0.60 to about 0.99—including all value and sub-ranges there-between.

In addition to reducing the amount of reflected sound in a single room environment, the building panel 100 of the present invention should also be able to exhibit superior sound attenuation—which is a measure of the sound reduction between an active room environment 2 and a plenary space 3. The ASTM has developed test method E1414 to standardize the measurement of airborne sound attenuation between room environments 3 sharing a common plenary space 3. The rating derived from this measurement standard is known as the Ceiling Attenuation Class (CAC). Ceiling materials and systems having higher CAC values have a greater ability to reduce sound transmission through the plenary space 3—i.e. sound attenuation function. The building panels 100 of the present invention may exhibit a CAC value of 30 or greater, preferably 35 or greater.

Figure 5:
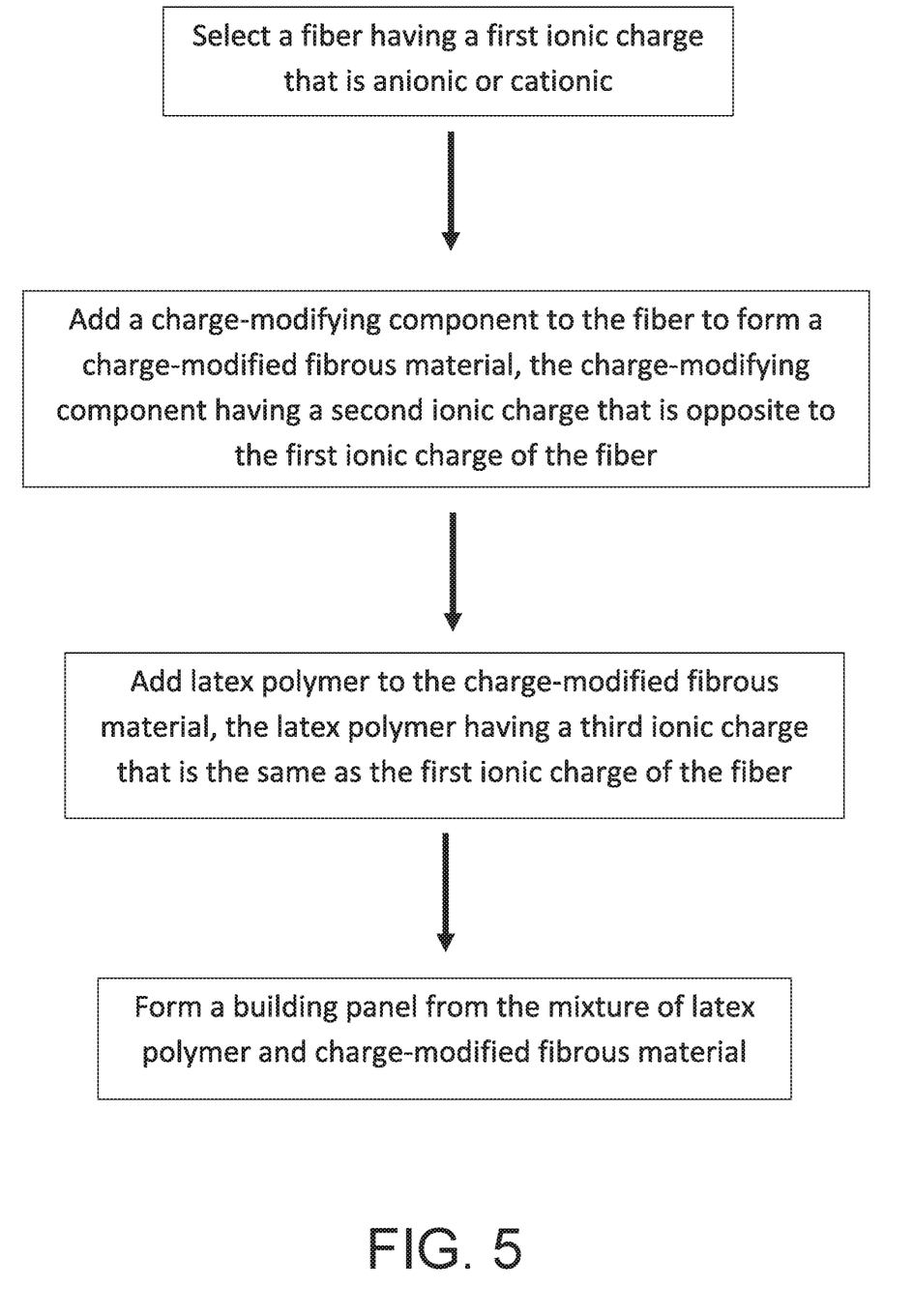
FIG. 5 is a flow-chart demonstrating a method of producing the building panel according to one embodiment of the present invention.

Referring now to FIG. 5, the present invention provides a building panel 100 formed from latex binder and fiber, wherein the fiber has been pre-treated with the charge-modifying component.

According to some embodiments, the fiber may be an inorganic fiber (such as mineral wool, fiberglass, etc.) that has a first ionic charge that is anionic. For mineral wool, the anionic nature of the first charge may stem from the inorganic metal oxides present on the mineral wool. Next, a charge-modifying component having a second ionic charge that is cationic is added to the inorganic fibers, thereby pre-treating the inorganic fibers to form a charge-modified fibrous material. The second ionic charge (cationic) of the charge-modifying component is opposite from the first ionic charge (anionic) of the inorganic fibers.

The pre-treatment of the inorganic fibers may be performed by adding the inorganic fibers and the charge-modifying component together in a water-containing bath (also referred to as an aqueous slurry). The temperature of the aqueous slurry may range from about 4.0° C. to about 66.0° C.—including all temperature and sub-ranges there-between. The aqueous slurry has maximum pH of about 7—preferably less than about 7. The inorganic fibers and the aqueous slurry may be agitated for a period ranging from about 2.0 minutes to about 60.0 minutes—including all times and sub-ranges there-between Subsequently, latex binder is added to the aqueous slurry. The latex binder comprises polymer having a third ionic charge that anionic. The third ionic charge of the latex binder is the same charge as the first ionic charge of the inorganic fiber. The third ionic charge of the latex binder is the opposite charge as the second ionic charge of the charge-modifying component.

The mixture of latex binder and charge-modified fibrous material may be agitated for a period of time ranging from about 2.0 minutes to about 60.0 minutes—including all times and sub-ranges there-between—and at a temperature ranging from about 4.0° C. to about 66.0° C.—including all temperatures and sub-ranges there-between.

The aqueous slurry may then be further processed into the body 120 of the present invention by a standard wet-laid process. The body 120 in the wet-state may be heated at an elevated temperature ranging from about 60° C. to about 300° C.—including all values and sub-ranges there-between—to dry the body 120 from the wet-state to the dry-state.

According to this embodiment, the charge-modifying component may be present in an amount ranging from about 0.1 wt. % to about 2.5 wt. % based on the total dry-weight of the body 120—including all amounts and sub-ranges there-between. The resulting body 120 may have a density ranging from about 100 kg/m$^3$ to about 600 kg/m$^3$. The total amount of latex binder may be present in as little as about 7 wt. % based on the total weight of the body 120 while still exhibit sufficient mechanical strength to withstand sagging in high-humidity environments.

According to other embodiments, the building panel 100 may be formed from organic fiber (such as cellulosic fiber) having a first ionic charge that is cationic. According to these embodiments, the charge-modifying component may have a second ionic charge that is anionic and is added to the organic fibers, thereby pre-treating the organic fibers to form a charge-modified fibrous material. The second ionic charge (anionic) of the charge-modifying component is opposite from the first ionic charge (cationic) of the organic fiber.

The pre-treatment of the organic fibers may be performed by the same methodology set forth with respect to the pre-treatment of the inorganic fibers except that the pH of the aqueous slurry may have a maximum pH of about 8.0, but preferably less than about 7.0.

Next, latex binder is added to the aqueous slurry. The latex binder includes polymer having a third ionic charge that is cationic. The third ionic charge of the latex binder is the same charge as the first ionic charge of the inorganic fiber. The mixture of latex binder and charge-modified fibrous material may be further processed into the body 120 according to the same process parameters as set forth with respect to the inorganic fiber, as previously discussed.

Figure 6:
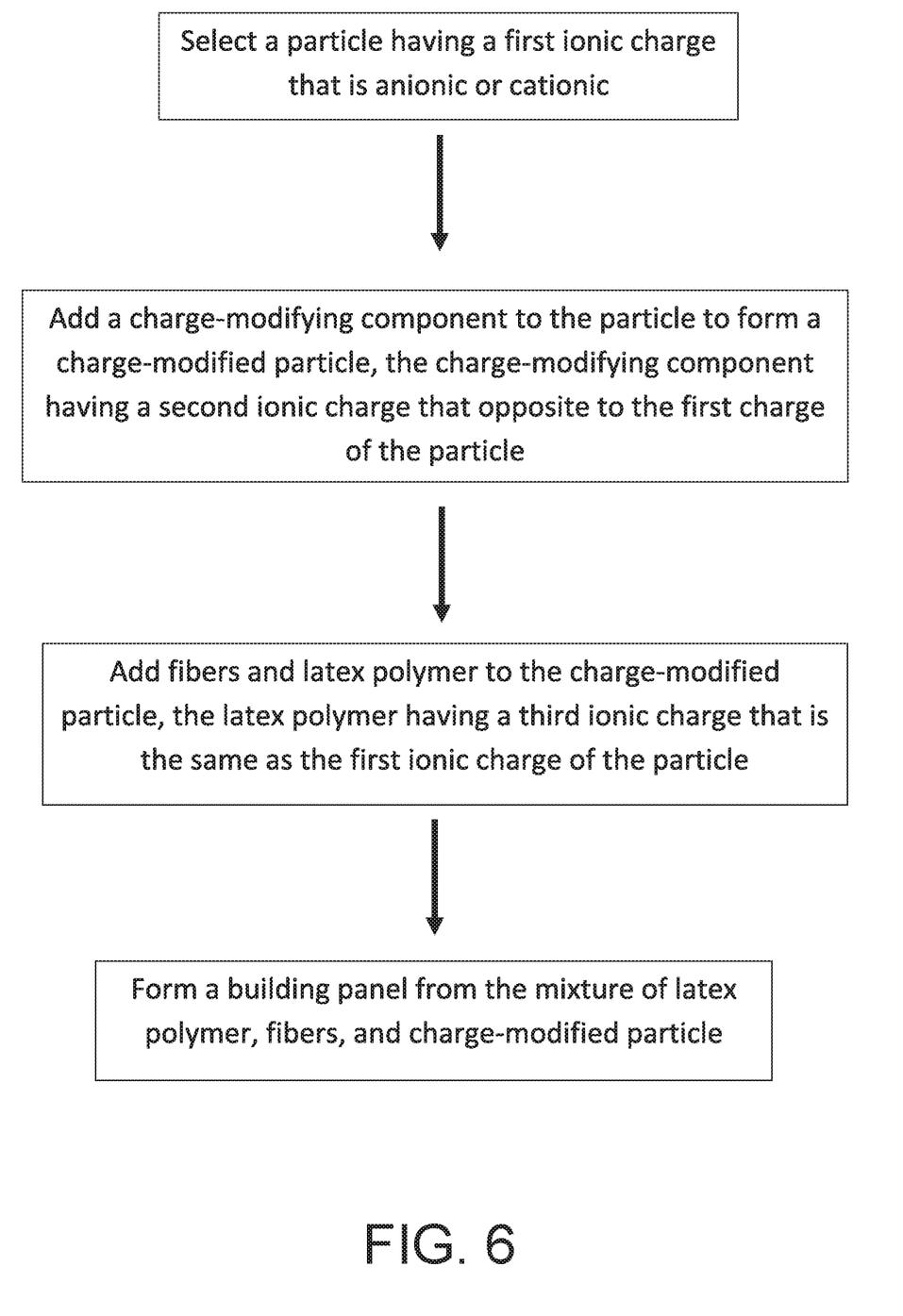
FIG. 6 is a flow-chart demonstrating a method of producing the building panel according to another embodiment of the present invention.

Referring now to FIG. 6, the present invention provides a building panel 100 comprising a body 120 that is formed from latex binder, fiber, and particles, wherein the particles have been pre-treated with the charge-modifying component. The building panel 100 of these embodiments may further comprise a non-woven scrim coupled to the lower surface 111 of the body 120 (not pictured).

According to one embodiment, the particles may be a first inorganic particle (such as perlite) that has a first ionic charge that is anionic. Next, a charge-modifying component having a second ionic charge that is cationic is added to the first inorganic particles, thereby pre-treating the first inorganic particles to form a charge-modified inorganic particle. The second ionic charge (cationic) of the charge-modifying component is opposite from the first ionic charge (anionic) of the first inorganic particles.

The pre-treatment of the first inorganic particles may be performed by adding the first inorganic particles and the first charge-modifying component together in a water-containing bath (also referred to as an aqueous slurry). The temperature of the aqueous slurry may range from about 4.0° C. to about 66.0° C.—including all temperature and sub-ranges there-between. The aqueous slurry has maximum pH of about 7—preferably less than about 7. The first inorganic particles and the first charge-modifying component in the aqueous slurry may be agitated for a period ranging from about 2.0 minutes to about 60.0 minutes—including all times and sub-ranges there-between.

According to some embodiments, a second inorganic particle may optionally be added to the aqueous slurry and pre-treated with a second charge-modifying component. The second inorganic particle may be selected from clay, calcium carbonate, or combinations thereof. The second inorganic particle may have an ionic charge that is the same charge as the first inorganic particle—which, according to this embodiment, is anionic. The second charge-modifying component may be the same as the first charge-modifying component—i.e., the second charge-modifying component having an ionic charge that is the same as the second ionic charge, which according to this embodiment is cationic.

According to some embodiments, the building panel may comprise only the second charge-modified inorganic particle and be substantially free of the first charge-modified inorganic particle. Stated otherwise, in some embodiments, the building panel 100 may comprise a charge-modified particle of clay and/or calcium carbonate without any charge-modified particles of perlite.

Next, latex binder and fiber may be added to the aqueous slurry. The latex binder and fiber may be added simultaneously. The fiber may be added before the latex binder is added (or vice versa). The latex binder comprises polymer having a third ionic charge that anionic. The third ionic charge of the latex binder is the same as the first ionic charge of the first inorganic particles. The fiber may be inorganic fiber and have a fourth ionic charge that is anionic. The fourth ionic charge of the inorganic fiber may be the same as the first ionic charge of the first inorganic particles.

The mixture of latex binder, inorganic fiber, and charge-modified fibrous material may be agitated for a period of time ranging from about 2.0 minutes to about 60.0 minutes—including all times and sub-ranges there-between—and at a temperature ranging from about 4.0° C. to about 66.0° C.—including all temperatures and sub-ranges there-between.

The aqueous slurry may then be further processed into the body 120 of the present invention by a standard wet-laid process. The body 120 in the wet-state may be heated at an elevated temperature ranging from about 60° C. to about 300° C.—including all values and sub-ranges there-between—to dry the body 120 from the wet-state to the dry-state.

According to this embodiment, the charge-modifying component may be present in an amount ranging from about 0.1 wt. % to about 4.0 wt. % based on the total dry-weight of the body 120—including all amounts and sub-ranges there-between. The charge-modified inorganic particle may be present in an amount ranging from about 5 wt. % to about 60 wt. % based on the total dry-weight of the body 120. The resulting body 120 may have a density ranging from about 100 kg/m$^3$ to about 400 kg/m$^3$. The total amount of latex binder may be present in as little as about 5 wt. % based on the total weight of the body 120 while still exhibit sufficient mechanical strength to withstand sagging in high-humidity environments.

According to other embodiments, the particles may be an organic particle that has a first ionic charge that is cationic. Next, a charge-modifying component having a second ionic charge that is anionic is added to the organic particles, thereby pre-treating the organic particles to form a charge-modified organic particle. The second ionic charge (anionic) of the charge-modifying component is opposite from the first ionic charge (cationic) of the organic particles.

The pre-treatment of the organic particles may be performed by the same methodology set forth with respect to the pre-treatment of the inorganic fibers except that the pH of the aqueous slurry may have a maximum pH of about 8.0, but preferably less than about 7.0.

Next, latex binder and fiber may be added to the aqueous slurry. The latex binder and fiber may be added simultaneously or fiber can be added before the latex binder is added (or vice versa). The latex binder comprises polymer having a third ionic charge that cationic. The third ionic charge of the latex binder is the same as the first ionic charge of the organic particles. The fiber may be organic fiber and have a fourth ionic charge that is cationic. The fourth ionic charge of the organic fiber may be the same as the first ionic charge of the organic particles.

The mixture of latex binder, fiber, and charge-modified organic particles may be further processed into the body 120 according to the same process parameters as set forth with respect to the inorganic particles, as previously discussed.

Figure 7:
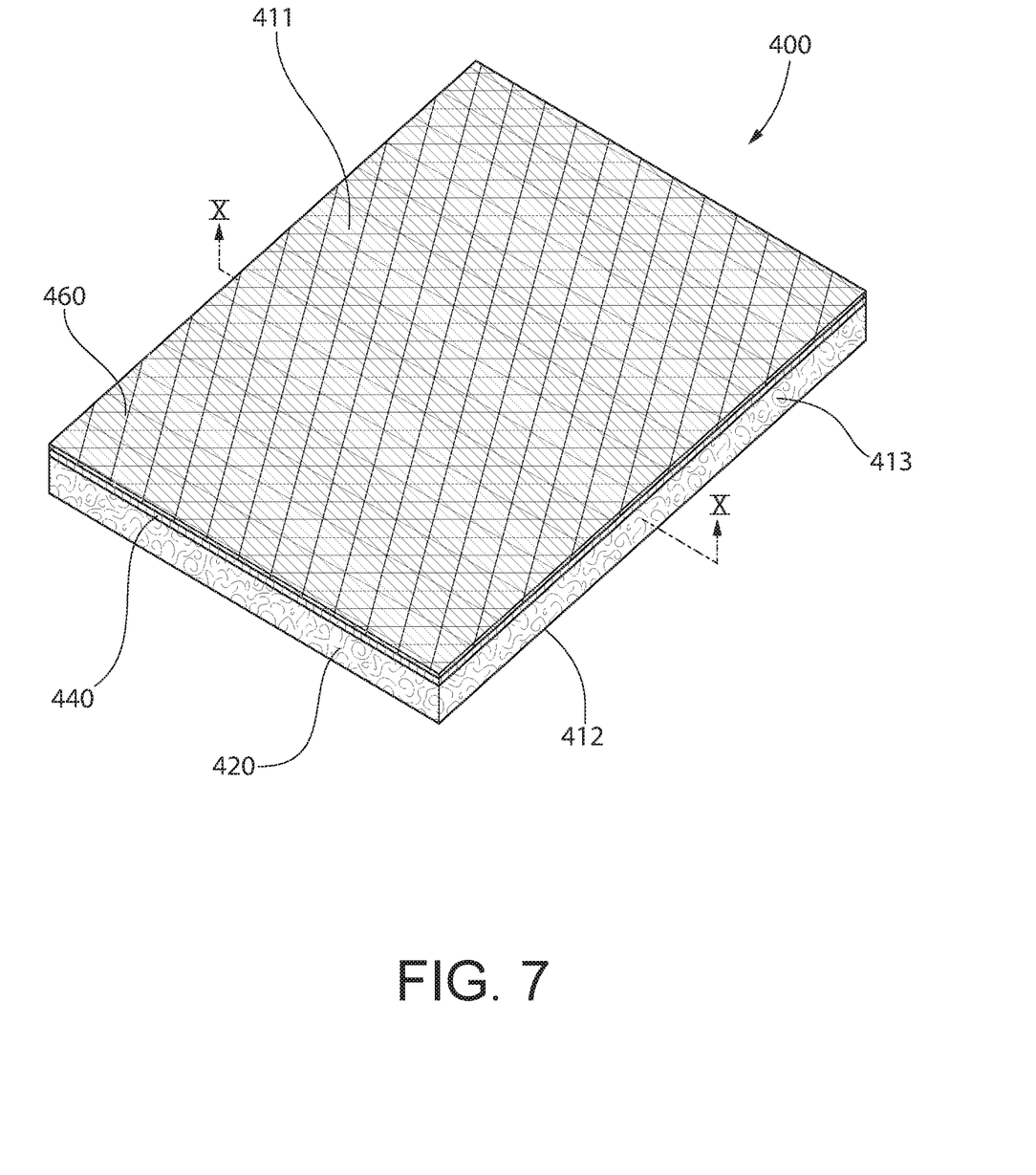
FIG. 7 top perspective view of a building panel according to another embodiment of the present invention.
Figure 8:
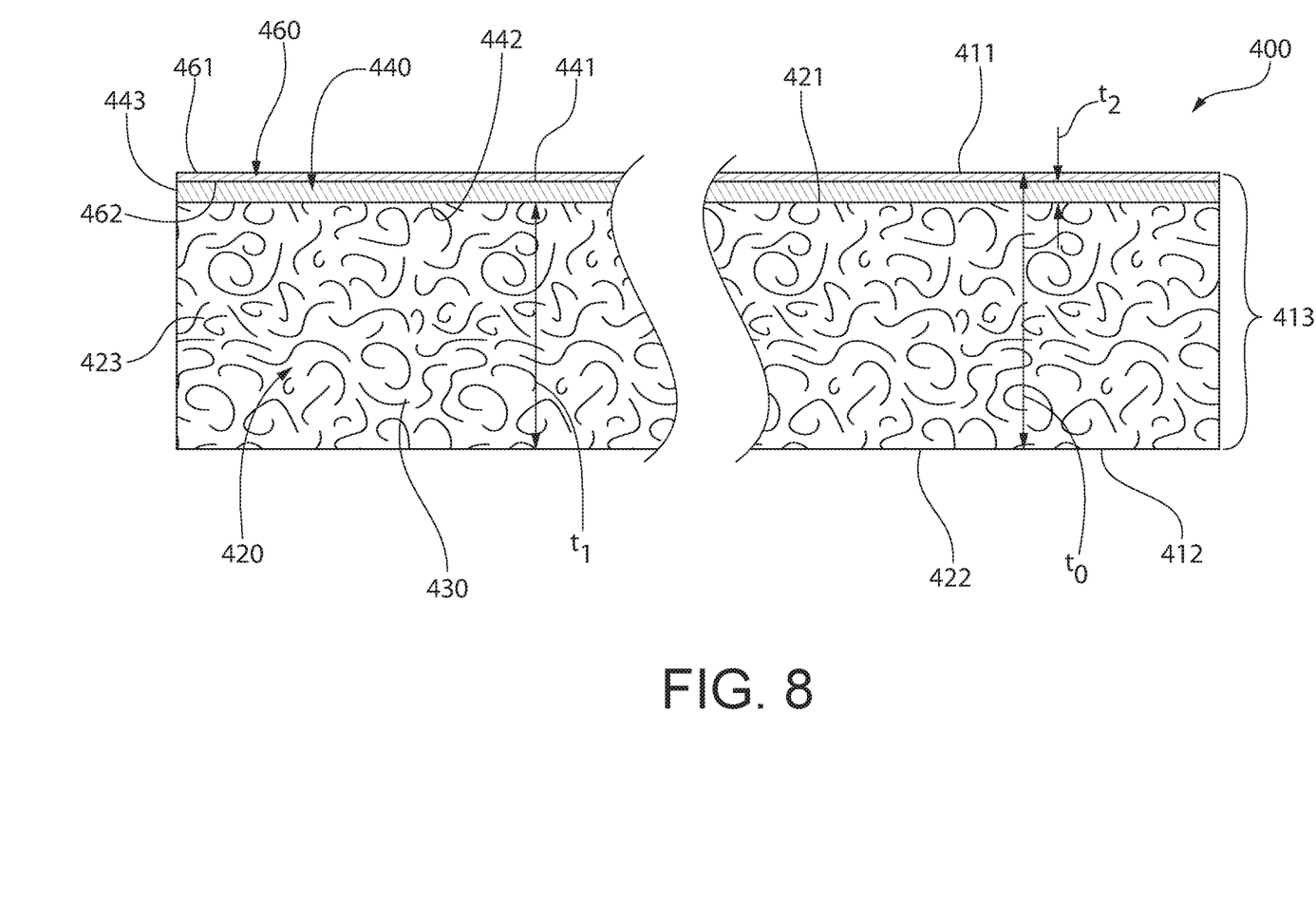
FIG. 8 is a cross-sectional view of the building panel according to the present invention, the cross-sectional view being along the X line set forth in FIG. 8.

Referring now to FIGS. 7 and 8, a building panel 400 is illustrated in accordance with another embodiment of the present invention. The building panel 400 is similar to the building panel 100 except as described herein below. The description of the building panel 100 above generally applies to the building panel 400 described below except with regard to the differences specifically noted below. A similar numbering scheme will be used for the building panel 400 as with the building panel 100 except that the 400-series of numbers will be used.

The building panel 400 may comprise a first major surface 411 opposite a second major surface 412. The building panel 400 may further comprise a side surface 413 that extends between the first major surface 411 and the second major surface 412, thereby defining a perimeter of the ceiling panel 400. The building panel 400 may have a panel thickness to that extends from the first major surface 411 to the second major surface 412. The panel thickness to may range from about 12 mm to about 40 mm—including all values and sub-ranges there-between. The building panel 400 exhibits superior resistance to stain-formation on at least the first major surface 411.

The building panel 400 may comprise a body 420 having an upper surface 422 opposite a lower surface 421 and a body side surface 423 extending between the upper surface 422 and the lower surface 421, thereby defining a perimeter of the body 420. The body 420 may have a body thickness $t_1$ that extends from the upper surface 422 to the lower surface 221. The body thickness $t_1$ may range from about 12 mm to about 40 mm—including all values and sub-ranges there-between.

The body 420 is a porous structure, allowing airflow through the body 420 between the upper surface 422 and the lower surface 421—as discussed further herein. The body 420 may be comprised of latex binder and fibers 430—as previously discussed. In some embodiments, the body 420 may further comprise a filler and/or additives.

The building panel 400 may further comprise a non-woven scrim 440 having a first major surface 441 opposite a second major surface 442. The second major surface 442 of the non-woven scrim 440 may face the lower surface 421 of the body 420. In some embodiment the second major surface 442 of the non-woven scrim 440 may be in direct contact with the lower surface 421 of the body 420—there being no intervening layers. In some embodiments the non-woven scrim 440 may be adhered to the body 420 by an adhesive being present between the second major surface 442 of the non-woven scrim 440 and the lower surface 421 of the body 420. The upper surface 422 of the body 420 may remain exposed.

The non-woven scrim 440 of the present invention may be formed from fiberglass. The non-woven scrim may be hydrophobic in nature. The non-woven scrim may have a thickness $t_2$ that ranges from about 0.3 mm to about 1.0 mm—including all thicknesses and sub-ranges there-between. The non-woven scrim may have a first airflow resistance—as measured between the first and second major surfaces 441, 442 of the non-woven scrim 440—that ranges from about 40 MKS Rayls to about 250 MKS Rayls—including all values and sub-ranges there-between. The non-woven scrim 440 may have a density ranging from about 50 g/m$^3$ to about 200 g/m$^3$—including all densities and sub-ranges there-between.

The building panel 400 may comprise a face coating 460 applied directly to the first major surface 441 of the non-woven scrim 440. The first major surface 411 of the building panel 400 may comprise the face coating 460. The face coating 460 may, in the dry-state, be present in an amount ranging from about 5 g/m$^2$ to about 40 g/m$^2$—including all values and sub-ranges there-between. The second layer 260 may be discontinuous.

The face coating 460 may comprise binder. Non-limiting examples of binder may include a polyurethane binder, polyester binder, epoxy based binder (i.e., cured epoxy resin), polyvinyl alcohol (PVOH), a latex, and a combination of two or more thereof. The binder may be present in the face coating 460 in an amount ranging from about 1 wt. % to about 25 wt. % based on the total weight of the face coating 460—including all values and sub-ranges there-between.

The face coating 460 may comprise filler. Non-limiting examples of filler may include powders of calcium carbonate, including limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate. The filler may be present in an amount ranging from about 25 wt. % to about 99 wt. % based on the total dry weight of the face coating 460—including all values and sub-ranges there-between.

The face coating 460 may comprise a hydrophobic component. Non-limiting examples of the hydrophobic component include waxes, silicones, fluoro-containing additives, and combinations thereof—as discussed further herein.

The wax may have a number average molecular weight ranging from about 100 to about 10,000—including all values and sub-ranges there-between. The wax may have a melting point (Tm) ranging from about 0° C. to about 150° C.—including all values and sub-ranges there-between. In a preferred embodiment, the wax may have a melting point ranging from about 8° C. to about 137° C.—including all values and sub-ranges there-between. The wax may exhibits less than 20 wt. % of weight loss when heated to a temperature of about 260° C. In a preferred embodiment, the wax may exhibits less than 12 wt. % of weight loss when heated to a temperature of about 260° C.

Non-limiting examples of wax include paraffin wax (i.e. petroleum derived wax), polyolefin wax, as well as naturally occurring waxes and blends thereof. Non-limiting examples of polyolefin wax include high density polyethylene ("HDPE") wax, polypropylene wax, polybutene wax, polymethypentene wax, and combinations thereof. Naturally occurring waxes may include plant waxes, animal waxes, and combination thereof. Non-limiting examples of animal waxes include beeswax, tallow wax, lanolin wax, animal fax based wax, and combinations thereof. Non-limiting examples of plant waxes include soy-based wax, carnauba wax, ouricouri wax, palm wax, candelilla wax, and combinations thereof.

The hydrophobic component may be applied as a water-based emulsion. The emulsion may be anionic or non-ionic. The emulsion may have a solid content (i.e., the amount of wax within the hydrophobic component) ranging from about 20 wt. % to about 60 wt. % based on the emulsion—including all value and sub-ranges there-between.

The silicone may be selected from a silane, a siloxane, and blends thereof. Non-limiting examples of siloxane include dimethysiloxane, silsesquioxane, aminoethylaminopropyl silsesquioxane, octamethylcyclotetrasiloxane, and combinations thereof. In some embodiments, the siloxane may be hydroxyl terminated.

Non-limiting examples of silanes include saturated compounds having hydrogen and silicon atoms and are bonded exclusively by single bonds. Each silicon atom has 4 bonds (either Si—R or Si—Si bonds), wherein R may be hydrogen (H), or a C1-C10 alkyl group—including but not limited to methyl, ethyl, propyl, butyl, etc. Each R groups is joined to a silicon atom (H—Si bonds). A series of linked silicon atoms is known as the silicon skeleton or silicon backbone. The number of silicon atoms is used to define the size of the silane (e.g., $Si_2$-silane). A silyl group is a functional group or side-chain that, like a silane, consists solely of single-bonded silicon and hydrogen atoms, for example a silyl (—$SiH_3$) or disilanyl group. The simplest possible silane (the parent molecule) is silane, $SiH_4$.

Silanes used herein may be organofunctional silanes of formula:

where Y is a hydroxyl group or a primary or secondary amino group and $R^1$ and $R^2$ are the same or different, monovalent, optionally substituted hydrocarbon groups which comprise between 1 and 12 carbon atoms and can be interrupted with heteroatoms. Silanes operative herein illustratively include an aromatic silane or an alkyl silane. The alkyl silane may comprise linear alkyl silane such as methyl silane, fluorinated alkyl silane, dialkyl silanes, branched and cyclic alkyl silanes etc. A non-limiting example of the silane is octyltriethoxysilane.

Non-limiting examples of a siloxane may include silicon oil, such as acyclic and/or cyclic dimethyl silicone oil—including but not limited to dimethylsiloxane, hexamethyldisiloxane, octamethyltrisiloxane, decamethylcyclopentasiloxane, octamethylcyclotetrasiloxane, and combinations thereof.

The silicone may be a water-based emulsion blend of silane and siloxane, such as commercially available IE-6682 from Dow Corning®, IE-6692 from Dow Corning®, and IE-6694 from Dow Corning®.

The fluoro-containing additives may comprise fluorocarbon-modified polyacrylate neutralized with dimethyl ethanol amine (DMEA) or a fluorosurfactant. The fluorosurfactant may be nonionic or anionic. The anionic moiety of the fluorosurfactant according to the present invention is selected from a sulfate, sulfonate, phosphate, or carboxylate moiety. According to some embodiments, the fluorosurfactant of the present invention may have at least one of the following formulas:

Formula I: $(R_fAO)S(O)_2(O^-M^+)$
Formula II: $(R_fAO)P(O)(O^-M^+)_2$
Formula III: $(R_fAO)_2P(O)(O^-M^+)$
Formula IV: $(R_fAO)C(O)(O^-M^+)$ wherein $R_f$ is a $C_1$ to $C_{16}$ linear or branched perfluoroalkyl, which may be optionally interrupted by one, two or three ether oxygen atoms.

A is selected from: $(CH_2CF_2)_m(CH_2)_n$; $(CH_2)_oSO_2N(CH_3)(CH_2)_p$; $O(CF_2)_q(CH_2)_r$; or $OCHFCF_2OE$;

m is 0 to 4;
n, o, p, and r, are each independently 2 to 20;
q is 2;

E is a $C_2$ to $C_{20}$ linear or branched alkyl group optionally interrupted by oxygen, sulfur, or nitrogen atoms; a cyclic alkyl group, or a $C_6$ to $C_{10}$ aryl group;

M is a Group I metal or an ammonium cation $(NHx(R_2)y)^+$, wherein R2 is a $C_1$ to $C_4$ alkyl; x is 1 to 4; y is 0 to 3; and x+y is 4.

The hydrophobic component may be present in an amount ranging from about 0.1 wt. % to about 10 wt. % based on the total dry-state weight of the face coating 460—including all value and sub-ranges there-between.

According to the present invention, the building panel 400 may have the face coating 460 and non-woven scrim 440 present on the body 420 without substantially degrading the desired NRC performance of the building panel 400. Specifically, the body 420 may exhibit a first NRC value as measured between the lower surface 421 and the upper surface 422. Additionally, when the face coating 460 and non-woven scrim 440 are applied to the body 420, the building panel will exhibit a second NRC performance that is at least 90% of the first NRC value, wherein the NRC value is measured from the lower surface 461 of the face coating 460 to the upper surface 422 of the body 420.

The non-woven scrim 440 having the face coating 460 applied thereto may further have a second airflow resistance as measured from second major surface 442 of the non-woven scrim 460 through the face coating 460. The second airflow resistance may be between 5 times (5×) to 10 times (10×) the first airflow resistance of just the non-woven scrim 440. Non-limiting examples of the second airflow resistance may range from about 100 MKS Rayls to about 1,000 MKS Rayls—including all values and sub-ranges there-between.

After manufacturing the body 200, 300 of the present invention the first layer 250, 350, second layer 260, 360, and optionally side layers 290 may be applied to the body 200, 300. Specifically, the various layers may be applied individually, in a wet-state, by spray coating, roll coating, dip coating, and a combination thereof—followed by drying at a temperature ranging from about 60° C. to about 300° C.—including all values and sub-ranges there-between.

EXAMPLES

The following experiment demonstrates the stain resistance imparted the hydrophobic scrim being used in combination with a hydrophobic face coating. For this experiment, two sets of three building panels were prepared (six, total). The two sets were then subjected to three different side-by-side comparisons under different water-staining test conditions—as described further herein.

A first set of building panels (referred to as Example 1) was prepared such that each panel included a body, a non-woven scrim, and a face coating. The body is formed from mineral fiber and a styrene latex binder, and includes a first major surface opposite a second major surface. The body did not comprise a hydrophobic agent. The non-woven scrim is formed from fiberglass and has a first major surface opposite a second major surface. The non-woven scrim exhibits is hydrophobic characteristics. The second major surface of the non-woven scrim is attached to the first major surface of the body—there being no intermediate layers—and the second major surface of the body remains exposed. The coating is applied to the first major surface of the scrim, whereby the coating comprises inorganic filler, a hydrophobic agent, and a copolymer of acrylic acid and styrene.

A second set of building panels (referred to as Comparative Example 1) was prepared such that each panel was the same as the first set of building panels of Example 6, except that no hydrophobic agent is present in the coating and the scrim has no hydrophobic characteristics.

Each panel of the first and second sets were oriented such that the exposed second major surface of the body faced upwards and the coated non-woven scrim faced downward—thereby resembling the building panel in the installed state. The panels were then subjected to the following water-stain tests.

Test 1 included using a first pair of panels—one panel from each the first and second sets—whereby water was applied to the second major surface of each body at a rate of 120 ml/hour for a period of 4 hours total.

Test 2 included using a second pair of panels—one panel from each the first and second sets—whereby water was applied to the second major surface of each body at a rate of 210 ml/hour for a period of 20 hours total.

Test 3 included using a third pair of panels—one panel from each the first and second sets—whereby water in cycles. Each cycle included water being applied to the second major surface of each body at a rate of 200 ml/hour for a period of 2 hours total, followed by no application of water for a period of 4 hours. A total of three cycles were completed for Test 3.

After each pair of panels was subjected to the corresponding water-stain test, the amount of staining in the panel was observed by measuring the yellow color value (recorded as b* value using an LAV Xrite) on the coated scrim and comparing it to the yellow color value of the coated scrim recorded before being subjected to the water-stain testing. The resulting change in color value for each building panel is set forth below in Table 6.

TABLE 1

|        | Ex. 1        | Comp. Ex. 1  |
|--------|--------------|--------------|
| Test 1 | +0.05 yellow | +5.0 yellow  |
| Test 2 | +0.05 yellow | +2.2 yellow  |
| Test 3 | +0.0 yellow  | +3.0 yellow  |

As demonstrated by Table 6, the addition of the hydrophobic agent to the coating clearly demonstrates an improvement to stain prevention in building panels having a non-woven scrim applied to a fibrous body—even when the fibrous body itself does not contain a hydrophobic agent.

What is claimed is:

1. A building panel comprising:
    a latex binder;
    a fibrous material comprising a fiber pre-treated with a charge-modifying component;
        wherein the latex is present in a non-zero amount ranging up to about 15 wt. % based on the total dry-weight of the building panel; and
        wherein the charge-modifying component is selected from the group consisting of aluminum sulfate, poly(diallyldimethylammonium chloride), and combinations thereof.

2. The building panel according to claim 1, wherein the charge-modifying component is present in an amount ranging from about 0.1 wt. % to about 2.5 wt. % based on the total weight of the building panel.

3. The building panel according to claim 1, wherein the fiber is an inorganic fiber selected from the group consisting of mineral wool, fiberglass, and combinations thereof.

4. The building panel according to claim 1, further comprising a body formed from the latex binder and the fibrous material.

5. The building panel according to claim 4, wherein latex binder is present in a non-zero amount ranging up to about 10 wt. % based on the total dry-weight of the body.

6. The building panel according to claim 1, wherein the latex binder has a glass transition temperature ranging from about 60° C. to about 110° C.

7. The building panel according to claim 4, wherein the body has a density ranging from about 100 kg/m$^3$ to about 600 kg/m$^3$.

8. A method for producing a sag resistant building panel comprising:
    a) pre-treating a building material with a charge-modifying component to form a pre-treated building material by mixing the building material and the charge-modifying component in an aqueous slurry;
    b) mixing into the aqueous slurry a latex binder; and
    c) forming the building panel from the aqueous slurry;
        wherein the latex binder is present in a non-zero amount ranging up to about 15 wt. % based on the total dry-weight of the building panel.

9. The method according to claim 8, wherein the building material has a first ionic charge and the charge-modifying component has a second ionic charge that is opposite the first ionic surface charge.

10. The method according to claim 9, wherein the latex binder of step b) has a third ionic charge that is the same as the first ionic charge.

11. The method according to claim 9, wherein the second ionic charge is cationic.

12. The building panel according to claim 8, wherein the charge-modifying component is selected from the group consisting of aluminum sulfate, poly(diallyldimethylammonium chloride), and combinations thereof.

13. The method according to claim 8, wherein the building material is selected from the group consisting of perlite particles, clay particles, and combinations thereof.

14. The method according to claim 8, wherein subsequent to step b) and prior to step c), inorganic fibers are added to the aqueous slurry.

15. The method according to claim 8, wherein the building material of step a) is inorganic fiber.

16. The method according to claim 15, wherein the inorganic fiber is selected from the group consisting of mineral wool, fiberglass, and combinations thereof.

17. A building panel comprising:
    a latex binder;
    a fibrous material comprising a mineral wool pre-treated with a charge-modifying component having a cationic charge;
        wherein the latex is present in a non-zero amount ranging up to about 15 wt. % based on the total dry-weight of the building panel; and
        wherein the charge-modifying component is selected from the group consisting of aluminum sulfate, poly(diallyldimethylammonium chloride), and combinations thereof.

18. The building panel according to claim 17, further comprising an inorganic particle.

19. The method according to claim 8, wherein step a) comprises mixing the building material and the charge-modifying component for about 2.0 minutes to about 60.0 minutes.

20. The method according to claim 8, wherein step b) comprises mixing the latex binder and the pre-treated building material in the aqueous slurry for about 2.0 minutes to about 60.0 minutes.

\* \* \* \* \*